2,969,391

CERTAIN 1-ARYLSULFONYL-3-(TETRAHYDRO-DICYCLOPENTADIEN-9-YL)UREAS

John Alfred Aeschlimann, Montclair, and Arthur Stempel, Teaneck, N.J., assignors to Hoffmann-La Roche Inc., Nutley, N.J., a corporation of New Jersey No Drawing. Filed Sept. 15, 1959, Ser. No. 840,013

4 Claims. (Cl. 260—553)

This invention relates to novel chemical compounds and to novel methods for their preparation. More particularly, it relates to compounds of the general formula

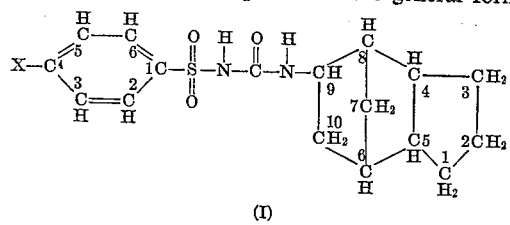

(I)

wherein the symbol X represents a member selected from the group consisting of hydrogen, methyl and a middle halogen (i.e. chlorine or bromine).

In one of its embodiments, the invention provides a general process for making compounds represented by the above Formula I which comprises reacting 9-aminotetrahydrodicyclopentadiene with phenylsulfonylurea or p-tolylsulfonylurea or p-chlorophenylsulfonylurea or p-bromophenylsulfonylurea.

In another of its embodiments, the invention provides an alternative general process for making compounds represented by the above Formula I which comprises reacting 9-aminotetrahydrodicyclopentadiene with phenylsulfonylisocyanate or p-tolylsulfonylisocyanate or p-chlorophenylsulfonylisocyanate or p-bromophenylsulfonylisocyanate.

The compounds of general Formula I and their pharmaceutical equivalents (e.g. salts of said compounds of Formula I with conventional pharmaceutically acceptable organic and inorganic bases, e.g. sodium-, potassium- and ammonium hydroxide, diethanolamine, triethanolamine and the like) are useful as hypoglycemic agents. In particular, the compounds of general Formula I are useful upon oral administration for the purpose of lowering the blood sugar level. The novel compounds of this invention can be employed generally in the same manner as known hypoglycemic agents, of the type of tolbutamide and similar substituted sulfonylureas.

The invention is further disclosed in the following examples, which are illustrative but not limitative thereof. Temperatures are in degrees centigrade.

Example 1

A suspension of 243 g. of dicyclopentadiene-bisnitrosochloride [Wieland, Ber. deutsch. chem. Ges., 39, 1495 (1906)] in 940 cc. of isoamyl alcohol was refluxed for 40 minutes. The dark solution was evaporated to dryness in vacuo and the residue was dissolved in 2.2 liters of ethanol. Following addition of 190 g. of zinc dust, 180 cc. of acetic acid was added dropwise. The reaction mixture was then refluxed for one hour. After cooling, excess zinc was filtered off and the alcoholic filtrate was concentrated to dryness in vacuo. The residue was stirred with 2.3 liters of benzene and 1.5 liters of water for 15 minutes. The aqueous layer was separated and reextracted with 0.5 liter of benzene. The combined benzene layers were washed with dilute sodium carbonate and then again with water. After drying over sodium sulfate, the benzene was distilled in vacuo. The residue was then extracted with 1.5 liters of hot hexane. The hexane solution was filtered to remove an insoluble residue. Following evaporation of the hexane in vacuo, the residue was distilled in a high vacuum. The fraction distilling at 105–120°/1.0 mm. was collected (yield 110 g.). Crystallization of the distillate from hexane gave 73.5 g. of the oxime of 9-keto-9,10-dihydrodicyclopentadiene, M.P. 75–83°. Further recrystallization raised the melting point to 85–87°.

A solution of 31.5 g. of the above 9-keto-9,10-dihydrodicyclopentadiene oxime in 500 cc. of 15% ethanolic ammonia containing approximately 25 g. of Raney nickel was reduced in an autoclave at 50° at an initial pressure of 500 p.s.i.g. of hydrogen. Three mols of hydrogen were absorbed. After cooling, the catalyst was removed by filtration and the filtrate then concentrated to dryness in vacuo. The residue was dissolved in dilute hydrochloric acid and extracted with benzene to remove non-basic material. The aqueous layer was then made strongly basic with 40% sodium hydroxide and extracted with benzene. After drying over sodium sulfate, the benzene extracts were concentrated to dryness in vacuo to give 26.2 (90% yield) of 9-aminotetrahydrodicyclopentadiene.

Example 2

A solution of 53 g. of 9-keto-9,10-dihydrodicyclopentadiene oxime in 1200 cc. of ethanol containing 5 g. of platinum oxide catalyst was reduced in an autoclave at room temperature and 500 p.s.i.g. initial hydrogen pressure. One mol of hydrogen was absorbed and the reaction stopped. After filtration to remove the catalyst, the solvent was removed by distillation in vacuo. The residue of 9-keto-tetrahydrodicyclopentadiene was then dissolved in one liter of 15% alcoholic ammonia, approximately 35 g. of Raney nickel added, and reduced at 50° and 500 p.s.i.g. initial pressure of hydrogen. Two mols of hydrogen were absorbed. The catalyst was filtered off, and the filtrate taken to dryness in vacuo. The residue was dissolved in dilute hydrochloric acid and extracted with benzene. A concentrated solution of sodium hydroxide was then added to the aqueous layer until it was strongly alkaline. The amine that separated was extracted with benzene, the benzene layer dried over sodium sulfate, and the solvent then removed in vacuo. A residue of 40.4 g. of 9-aminotetrahydrodicyclopentadiene remained (82% yield).

Example 3

To a solution of 25.8 g. of 9-aminotetrahydrodicyclopentadiene (from Example 1) in 500 cc. of benzene, 33.5 g. of p-tolylsulfonylisocyanate was added. After one hour at room temperature, "Skellysolve B" (essentially a normal hexane fraction) was added to turbidity. On scratching, 1-(p-tolylsulfonyl)-3-(tetrahydrodicyclopentadien-9-yl)urea crystallized—yield 42.7 g., M.P. 179–183°. Two crystallizations from acetonitrile raised the melting point to a constant value of 197–198.5°, yield 28.0 g. (47%).

Example 4

A suspension of 54.3 g. of 9-aminotetrahydrodicyclopentadiene (from Example 2) and 77.0 g. of p-tolylsulfonylurea in one liter of chlorobenzene was heated to reflux for one hour. Ammonia was evolved and the solids went into solution. After cooling, chlorobenzene was removed by distillation in vacuo. The residue was then crystallized several times from acetonitrile to give 37.6 g.

of 1-(p-tolylsulfonyl) - 3 - (tetrahydrodicyclopentadien-9-yl)urea; M.P. 197–199° (30% yield).

*Example 5*

To a solution of 5.0 g. of 9-aminotetrahydrodicyclopentadiene (from Example 1) in 100 cc. of benzene, 6.3 g. of phenylsulfonylisocyanate was added. After about 30 minutes at room temperature, the product began to crystallize. After standing overnight at room temperature, 1-phenylsulfonyl - 3 - (tetrahydrodicyclopentadien-9-yl)urea was filtered off—yield 7.2 g., M.P. 198–201°. Two crystallizations from acetonitrile raised the melting point to 212–213°, yield 4.7 g.

*Example 6*

A solution of 5 g. of 9-aminotetrahydrodicyclopentadiene (from Example 1) in 100 cc. of benzene was treated with 5 cc. of p-chlorophenylsulfonylisocyanate. After one hour at room temperature, "Skellysolve B" was added to turbidity. On seeding, 8.1 g. of 1-(p-chlorophenylsulfonyl)-3-(tetrahydrodicyclopentadien - 9 - yl)urea crystallized, M.P. 155–161°. Several recrystallizations from aqueous ethanol gave 4.8 g. of product, M.P. 167–168.5°.

We claim:
1. A compound of the formula

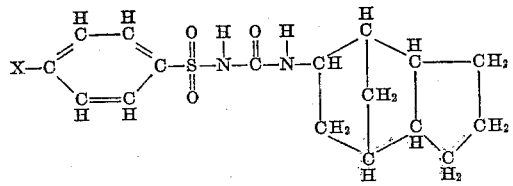

wherein X represents a member selected from the group consisting of hydrogen, methyl, chlorine and bromine.

2. 1-(p-tolylsulfonyl)-3-(tetrahydrodicyclopentadien-9-yl)urea.

3. 1 - phenylsulfonyl-3-(tetrahydrodicyclopentadien-9-yl)urea.

4. 1-(p-chlorophenylsulfonyl)-3-(tetrahydrodicyclopentadien-9-yl)urea.

References Cited in the file of this patent
UNITED STATES PATENTS
2,928,871     Aeschlimann et al. _____ Mar. 15, 1960